US012322131B2

(12) United States Patent
Malka et al.

(10) Patent No.: US 12,322,131 B2
(45) Date of Patent: Jun. 3, 2025

(54) METHOD AND SYSTEM FOR DISPLAYING A LARGE 3D MODEL ON A REMOTE DEVICE

(71) Applicant: Unity IPR ApS, Copenhagen (DK)

(72) Inventors: Francis Ruben Malka, Saint-Lambert (CA); Nicholas John Constantinidis, Laval (CA)

(73) Assignee: Unity IPR ApS, Copenhagen (DK)

( * ) Notice: Subject to any disclaimer, the term of this patent is extended or adjusted under 35 U.S.C. 154(b) by 709 days.

(21) Appl. No.: 17/405,786

(22) Filed: Aug. 18, 2021

(65) Prior Publication Data

US 2022/0058823 A1 Feb. 24, 2022

Related U.S. Application Data

(60) Provisional application No. 63/067,181, filed on Aug. 18, 2020.

(51) Int. Cl.
*G06T 7/73* (2017.01)
*G06T 17/20* (2006.01)
(Continued)

(52) U.S. Cl.
CPC .......... *G06T 7/73* (2017.01); *G06T 17/20* (2013.01); *G06T 19/00* (2013.01); *H04N 5/2224* (2013.01); *G06T 2210/12* (2013.01)

(58) Field of Classification Search
CPC ........... G06T 7/73; G06T 17/20; G06T 19/00; G06T 2210/12; G06T 15/20; G06T 15/40; H04N 5/2224
See application file for complete search history.

(56) References Cited

U.S. PATENT DOCUMENTS 8,314,790 B1 * 11/2012 Zeiger ..................... G06T 19/00
345/592
2015/0221135 A1 8/2015 Hill et al.

FOREIGN PATENT DOCUMENTS

JP 2002279449 A 9/2002
JP 2016110319 A 6/2016
(Continued)

OTHER PUBLICATIONS

Sung-Eui Yoon, B. Salomon and D. Manocha, "Interactive view-dependent rendering with conservative occlusion culling in complex environments," IEEE Visualization, 2003. VIS 2003., Seattle, WA, USA, 2003, pp. 163-170, doi: 10.1109/VISUAL.2003.1250368. (Year: 2003).*

(Continued)

*Primary Examiner* — Tom Y Lu
*Assistant Examiner* — Janice E. Vaz
(74) *Attorney, Agent, or Firm* — Schwegman Lundberg & Woessner, P.A.

(57) ABSTRACT

A method of displaying a digital object on a device is disclosed. A set of unique identifiers and associated is downloaded for a set of digital objects within a 3D model. A position and an orientation of a virtual camera is determined relative to the positions of the set of digital objects. A visibility score for each digital object of the set of digital objects is computed based on a position of the digital object relative to the position and the orientation of the virtual camera. A polygon mesh associated with a digital object with a highest visibility score is downloaded based on the polygon mesh being absent. The downloading uses a unique identifier of the set of unique identifiers associated with the polygon mesh. The polygon mesh of the digital object with the highest score is rendered and displayed on a display device.

20 Claims, 7 Drawing Sheets

(51) Int. Cl.
  *G06T 19/00* (2011.01)
  *H04N 5/222* (2006.01)

(56) References Cited

FOREIGN PATENT DOCUMENTS

JP  2022034560 A   3/2022
JP     7189288 B2  12/2022

OTHER PUBLICATIONS

D. Sidlauskas, S. Chester, E. Tzirita Zacharatou and A. Ailamaki, "Improving Spatial Data Processing by Clipping Minimum Bounding Boxes," 2018 IEEE 34th International Conference on Data Engineering (ICDE), Paris, France, 2018, pp. 425-436, doi: 10.1109/ICDE.2018.00046. (Year: 2018).*

I. M. Martin, "Hybrid transcoding for adaptive transmission of 3D content," Proceedings. IEEE International Conference on Multimedia and Expo, Lausanne, Switzerland, 2002, pp. 373-376 vol. 1, doi: 10.1109/ICME.2002.1035796. (Year: 2002).*

Lluch, Javier, et al., "Interactive three-dimensional rendering on mobile computer devices", Proceedings of The 2005 ACM SIGCHI International Conference on Advances in Computer Entertainment Technology, ACE 05, (Jun. 15, 2005), 254-262 (Year: 2005).*

Frederick, W. B, et al., "GameOD", 11th Proceedings of the ACM Symposium on Virtual Reality Software and Technology, VRST 2004, (Nov. 10, 2004), 129-136 (Year: 2004).*

R. Miao, J. Song and Y. Zhu, "3D geographic scenes visualization based on WebGL," 2017 6th International Conference on Agro-Geoinformatics, Fairfax, VA, USA, 2017, pp. 1-6, doi: 10.1109/Agro-Geoinformatics.2017.8046999. (Year: 2017).*

I. M. Boier-Martin, "Adaptive graphics," in IEEE Computer Graphics and Applications, vol. 23, No. 1, pp. 6-10, Jan.-Feb. 2003, doi: 10.1109/MCG.2003.1159606 (Year: 2003).*

Lluch Javier et al., "Interactive three-dimensional rendering on mobile computer devices", Proceedings of the 2005 ACM Sigchi International Conference on Advances in Computer Entertainment Technology, ACE 05, Jun. 15, 2005, p. 254-262 (Year: 2005).*

Frederick W.B., et al., "GameOD", 11th Proceedings of the ACM Symposium on Virtual Reality Software and Technology, VRST 2004, p. 129-136 (Year: 2004).*

"Canadian Application Serial No. 3,128,614, Examiners Rule 86(2) Report mailed Sep. 6, 2023", 3 pgs.

"Canadian Application Serial No. 3,128,614, Examiner's Rule 86(2) Requisition mailed Oct. 25, 2022", 5 pgs.

"Canadian Application Serial No. 3,128,614, Response Filed Feb. 27, 2023 to Examiner's Rule 86(2) Requisition mailed Oct. 25, 2022", 12 pgs.

"European Application Serial No. 21192001.2, Response Filed Dec. 7, 2022 to Extended European Search Report mailed May 31, 2022", 23 pgs.

"Japanese Application Serial No. 2021-133582, Response filed Oct. 24, 2022 to Notification of Reasons for Refusal mailed Aug. 30, 2022", w/ English Claims, 12 pgs.

"European Application Serial No. 21192001.2, Extended European Search Report mailed May 31, 2022", 9 pgs.

"Japanese Application Serial No. 2021-133582, Notification of Reasons for Refusal mailed Aug. 30, 2022", w/ English translation, 6 pgs.

Frederick, W. B, et al., "GameOD", 11th Proceedings of the ACM Symposium on Virtual Reality Software and Technology, VRST 2004, (Nov. 10, 2004), 129-136.

Lluch, Javier, et al., "Interactive three-dimensional rendering on mobile computer devices", Proceedings of The 2005 ACM SIGCHI International Conference on Advances in Computer Entertainment Technology, ACE 05, (Jun. 15, 2005), 254-262.

Lluch, Javier, et al., "Multiresolution 3D Rendering on Mobile Devices", Advances in Biometrics: International Conference, ICB 2007, Seoul, Korea; Proceedings; [Lecture Notes in Computer Science; Lect.Notes Computer], Springer, Berlin, Heidelberg, (May 28, 2006), 287-294.

European Application Serial No. 21192001.2, Communication Pursuant to Article 94(3) EPC mailed Nov. 8, 2023, 8 pgs.

* cited by examiner

METHOD AND SYSTEM FOR DISPLAYING A LARGE 3D MODEL ON A REMOTE DEVICE

CROSS-REFERENCE TO RELATED APPLICATIONS

This application claims the benefit of U.S. Provisional Application No. 63/067,181, filed Aug. 18, 2020, which is incorporated by reference herein in its entirety.

TECHNICAL FIELD

The subject matter disclosed herein generally relates to the technical field of computer systems and graphics, and in one specific example, to computer systems and methods for displaying a large 3D model on a remote device.

BACKGROUND OF THE INVENTION

As designers use mere powerful creation tools and 2D projects are increasingly becoming 3D projects, 3D models are getting larger and more ambitious. At the same time, visualization methods are changing; users who once visualized these models on powerful desktop computers now want to view them on smaller devices such as smartphones, tablets, and headsets. These two trends are moving in opposite directions, creating a need to visualize large 3D models on relatively small devices which may have limited memory, graphics, and processing power.

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

Figure 1A:
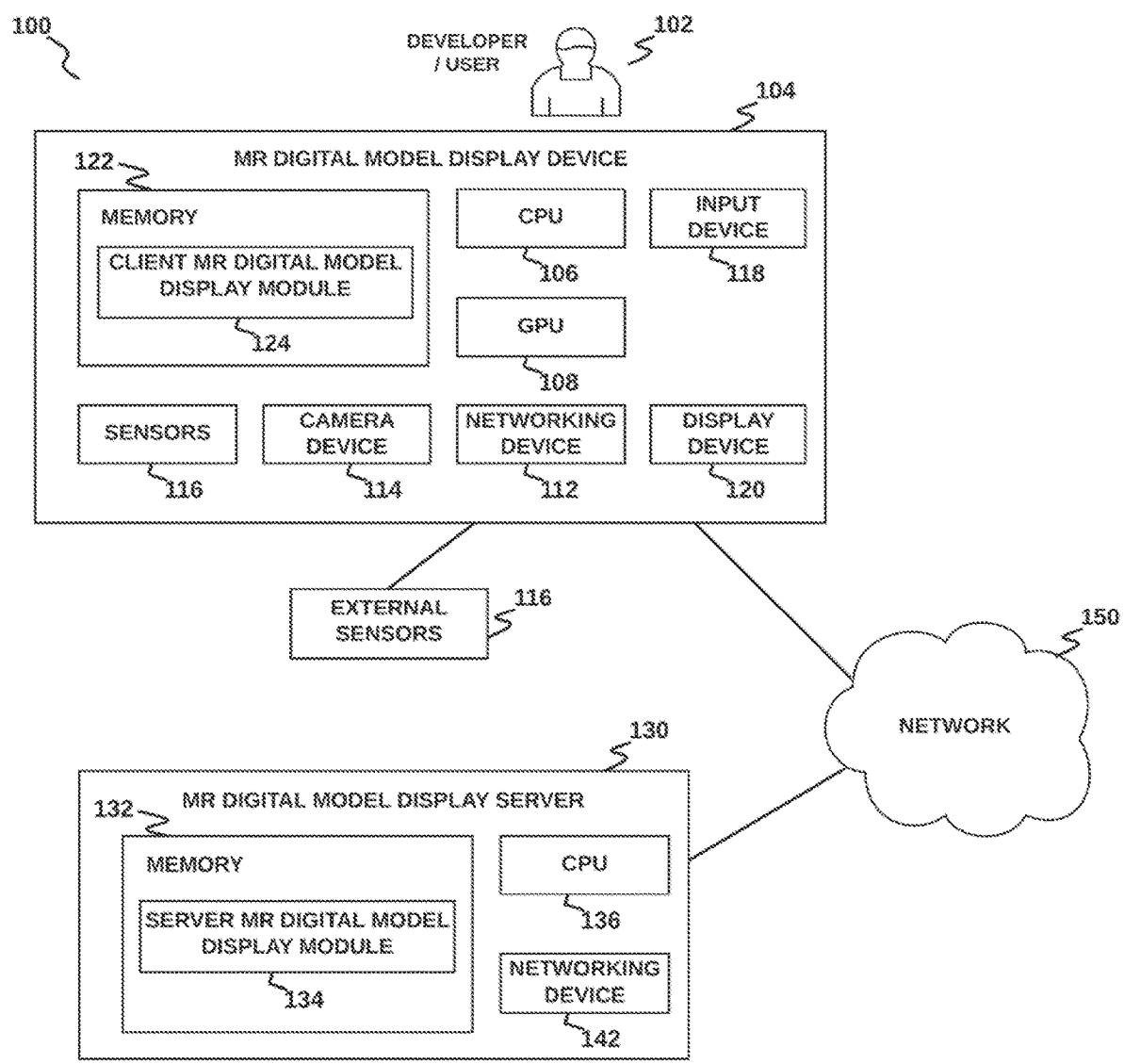
FIG. 1A is a schematic illustrating a MR digital model display system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any digital object or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can induce data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime.

The term 'runtime' used throughout the description herein should be understood to include a time during which a program (e.g., an application, a video game, a simulation, and the like) is running, or executing (e.g., executing programming code). The terra should be understood to include a time during which a video game is being played by a human user or played by an artificial intelligence agent.

The terms 'client' and 'application client' used throughout the description herein are understood to include a software client or software application that can access data and services on a server, including accessing over a network.

Throughout the description herein, the term 'mixed reality' (MR) should be understood to include all combined environments in the spectrum between reality and virtual reality (VR) including virtual reality, augmented reality (AR) and augmented virtuality.

Offering a solution to the problem of visualizing large 3D models on relatively small devices presents some challenges. One challenge involves the ability to display a 3D model that is larger than the total available memory on a device. Another challenge involves the ability to maintain an acceptable frame rate when displaying the model on a device that has limited graphics capabilities. Still another challenge may involve transferring the 3D model data over a network; for example, the 3D model can be so large that it is not conceivable to transfer all the data over a network connection in a reasonable amount of time (e.g., to be able to display objects contained in the model in conjunction with a live camera video feed in order to show meaningful data rapidly).

The challenges occur in domains where large 3D models need to be visualized, including architecture, engineering, construction, automotive, transportation, manufacturing, and medical. The challenges also occur in the context of a video game based on dynamic content. For example, open-world video games face similar challenges, as they need to display a large world (e.g., represented by a large 3D model) on a memory-constrained device. Slicing the world into tiles, baking all the geometry, the materials, and the textures into these tiles, then downloading a tile to the remote device is a common solution. It is applicable in the case of video games because game worlds are known in advance and the path of the players can be anticipated, triggering the loading of an adjacent tile at the expected moment. This method cannot be used when the world (e.g., a large 3D model) is not known in advance or is constantly changing, or when the user viewing the model can navigate randomly to any position at any time. Tiling and baking are not well suited to industrial applications, as the 3D models being viewed change from session to session, and the content of the 3D models themselves also changes (e.g., due to changes made by engineers, designers, architects, customers, and the like).

Another solution may involve copying (e.g., from a server) an entire 3D model onto a local storage of a remote device while a large network bandwidth is available between the server and the remote device. This has the downsides of using up a large amount of storage on the remote device, transferring data that may not be used (e.g., if users only visualize a portion of the 3D model), and having stale data on the remote device if the data changes on the server. In addition, this solution fails if the 3D model data does not fit in the local storage of the remote device.

A workaround to the problem may be to create a clipping box that limits the 3D models in all directions. This reduces the size of the geometry, materials, and textures needed to be displayed on the remote device by clipping everything that does not fit inside the clipping box. The downside of this approach is that only a portion of a large model can be visualized at a time. Multiple clipping boxes need to be created to cut a large 3D model into smaller 3D models, creating multiple, discontinuous experiences.

A method of displaying a digital object on a device is disclosed. A set of unique identifiers and associated positions is downloaded for a set of digital objects within a 3D model. A position and an orientation of a virtual camera is determined relative to the positions of the set of digital objects. A visibility score for each digital object of the set of digital objects is computed based on a position of the digital object relative to the position and the orientation of the virtual camera. A polygon mesh associated with a digital object with a highest visibility score is downloaded based on the polygon mesh being absent. The downloading uses a unique identifier of the set of unique identifiers associated with the polygon mesh. The polygon mesh of the digital object with the highest score is rendered and displayed on a display device.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine or unconventional operations.

The systems and methods described herein include one or more components or operations that are non-routine or unconventional individually or when combined with one or more additional components or operations, because, for example, they provide a number of valuable benefits to engineers and artists. For example, the systems and methods described herein allow for a viewing of a 3D model of a large (e.g., an almost infinite) size on a device with limited memory, graphics and networking capabilities, such as a phone, tablet, or headset; with the viewing taking place in a remote location. As another example, the systems and methods described herein simplify a displaying of a large 3D model by determining a downloading order for objects within the 3D model, the downloading being from a server to a remote device based on a position and orientation of a virtual camera on the remote device (e.g., a position and orientation relative to a physical structure, or a GPS location, or the like). As another example, the systems and methods described herein simplify a displaying of a large 3D model by displaying minimum bounding boxes as placeholders within a preview for objects within model while waiting for polygon meshes, materials, and textures to be available in local memory. The preview can optionally be enhanced by coloring the minimum bounding boxes using a color representative of the object color.

Turning now to the drawings, systems and methods, including non-routine or unconventional components or operations, or combinations of such components or operations, for displaying a large 3D model on a remote device in accordance with embodiments of the invention are illustrated. Accordingly, FIG. 1A is a diagram of an example MR digital model display system 100 and associated devices configured to provide MR digital model display system functionality to a user 102. In the example embodiment, the MR digital model display system 100 includes a MR digital model display device 104 which may be operated by the user 102 and a MR digital model display server device 130 coupled in networked communication via a network 150 (e.g., a cellular network, a Wi-Fi network, the Internet, and so forth). In some embodiments, the MR digital model display device 104 is a mobile computing device, such as a smartphone, a tablet computer, a laptop computer, a head mounted virtual reality (VR) device or a head mounted augmented reality (AR) device capable of providing a mixed reality experience to the user 102. In other embodiments, the MR digital model display device 104 is a computing device such as a desktop computer capable of providing a mixed reality experience to the user 102.

In the example embodiment, the MR digital model display device 104 includes one or more central processing units (CPUs) 106, and graphics processing units (GPUs) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks as described herein in reference to FIG. 2. The MR digital model display device 104 also includes one or more networking devices 112 (e.g., wired or wireless network adapters) for communicating across the network 150. The MR digital model display device 104 further includes one or more camera devices 114 which may be configured to capture digital video of the real world near the user 102 during operation. The MR digital model display device 104 may also include one or more sensors 116, such as a global positioning system (GPS) receiver (e.g., for determining a GPS location of the MR digital model display device 104), biometric sensors (e.g., for capturing biometric data of the user 102), motion or position sensors (e.g., for capturing position data of the user 102, the MR digital model display device 104 or other objects), or an audio microphone (e.g., for capturing sound data). Some sensors 116 may be external to the MR digital model display device 104, and may be configured to wirelessly communicate with the MR digital model display device 104 (e.g., such as used in the Microsoft Kinect®, Vive Tracker™, MIT's Lidar sensor, or MIT's wireless emotion detector).

The MR digital model display device 104 also includes one or more input devices 118 such as, for example, a keyboard or keypad, a mouse, a pointing device, a touchscreen, a hand-held device (e.g., hand motion tracking device), a microphone, a camera, and the like, for inputting information in the form of a data signal readable by the processing device 106. The MR digital model display device 104 further includes one or more display devices 120, such as a touchscreen of a tablet or smartphone, or lenses or visor of a VR or AR HMD, which may be configured to display virtual objects to the user 102 in conjunction with a real world view.

Figure 2:
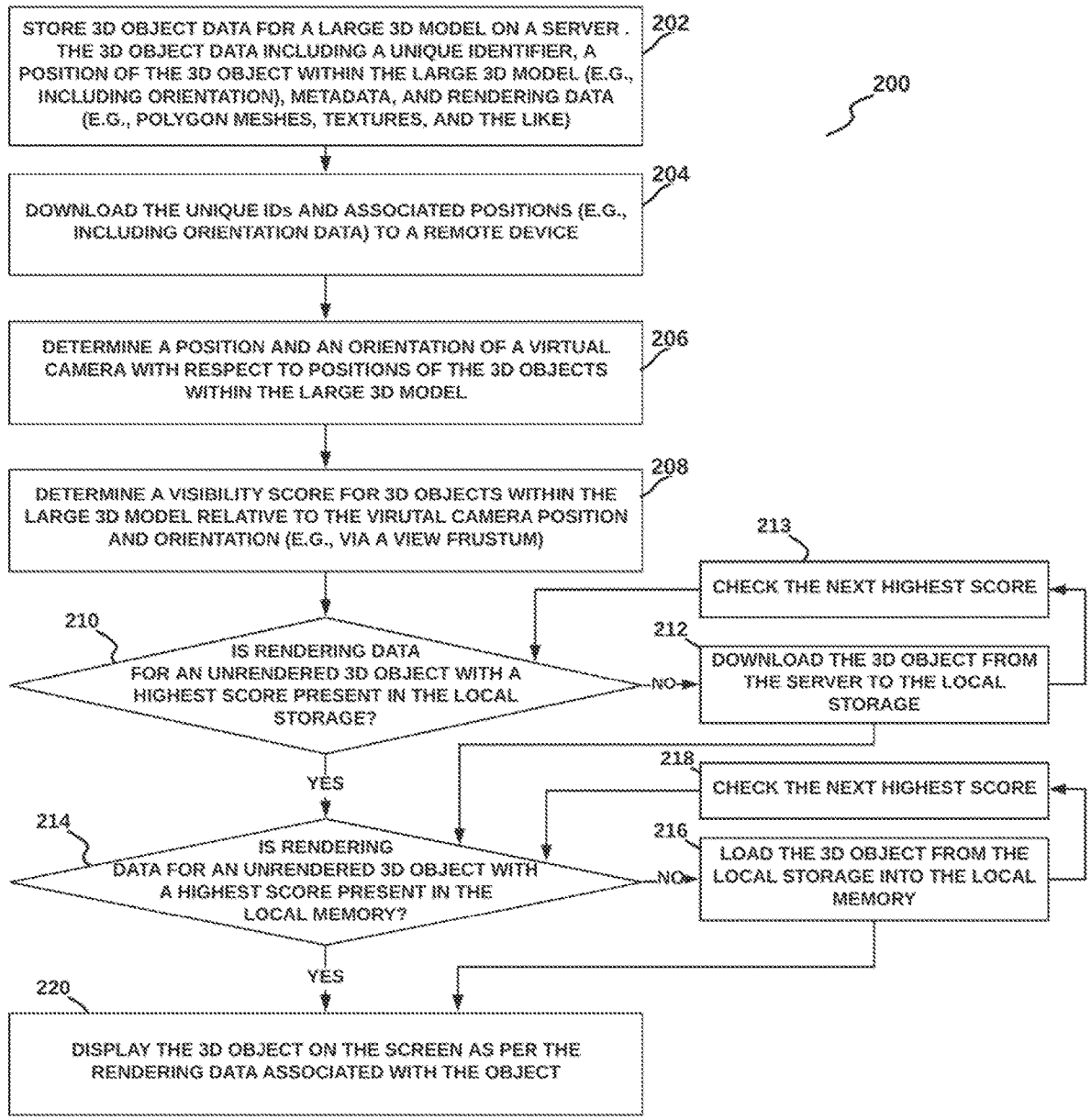
FIG. 2 is a flowchart of a method for displaying a large 3D model using a MR digital model display system, in accordance with one embodiment.

The MR digital model display device 104 also includes a memory 122 configured to store a client MR digital model display module ("client module") 124 configured to perform operations as described with respect to FIG. 2. The memory 122 can be any type of memory device, such as random access memory, read only or rewritable memory, internal processor caches, and the like. In accordance with an embodiment, though not shown in FIG. 1A, the memory 122 may be further divided into a local storage device for storing large amounts of data (e.g., including a hard disk drive, an SSD drive and memory sticks) and a local cache memory for quick retrieval of data (e.g., RAM memory, GPU memory, and CPU cache).

In accordance with an embodiment, the memory 122 may also store a game engine (e.g., executed by the CPU 106 or GPU 108) that communicates with the display device 120 and also with other hardware such as the input/output device(s) 118 to present a mixed reality environment to the user 102. The game engine (not shown in FIG. 1A) would typically include one or more modules that provide the following: simulation of a virtual environment and digital objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment) via the display device 120. In accordance with an embodiment, the simulation and rendering of the virtual environment may be de-coupled, each being performed independently and concurrently, such that the rendering always uses a recent state of the virtual environment and current settings of the virtual environment to generate a visual representation at an interactive frame rate and, independently thereof, the simulation step updates the state of at least some of the digital objects (e.g., at another rate).

In accordance with an example embodiment, the camera device 114 and sensors 116 capture data from an environment surrounding the device 104, such as video, audio, depth information, GPS location, and so forth. In accordance with an embodiment, the client MR digital model display module 124 may be configured to analyze the sensor data directly, or analyze processed sensor data which may be processed by an external module, application or service. For example, the processed sensor data may include a real-time list of detected and identified objects, object shape data, depth maps, and the like provided by an operating system application or SDK (e.g., ARCore™ and ARKit™).

In accordance with an embodiment, the MR digital model display server 130 includes a memory 132 storing a server MR digital model display module ("server module") 134. During operation, the client MR digital model display module 124 and the server MR digital model display module 134 perform the various MR digital model display functionalities described herein with respect to FIG. 2. More specifically, in some embodiments, some functionality may be implemented within the client module 124 and other functionality may be implemented within the server module 134 as specifically described with respect to the method 200 detailed in FIG. 2.

Figure 1B:
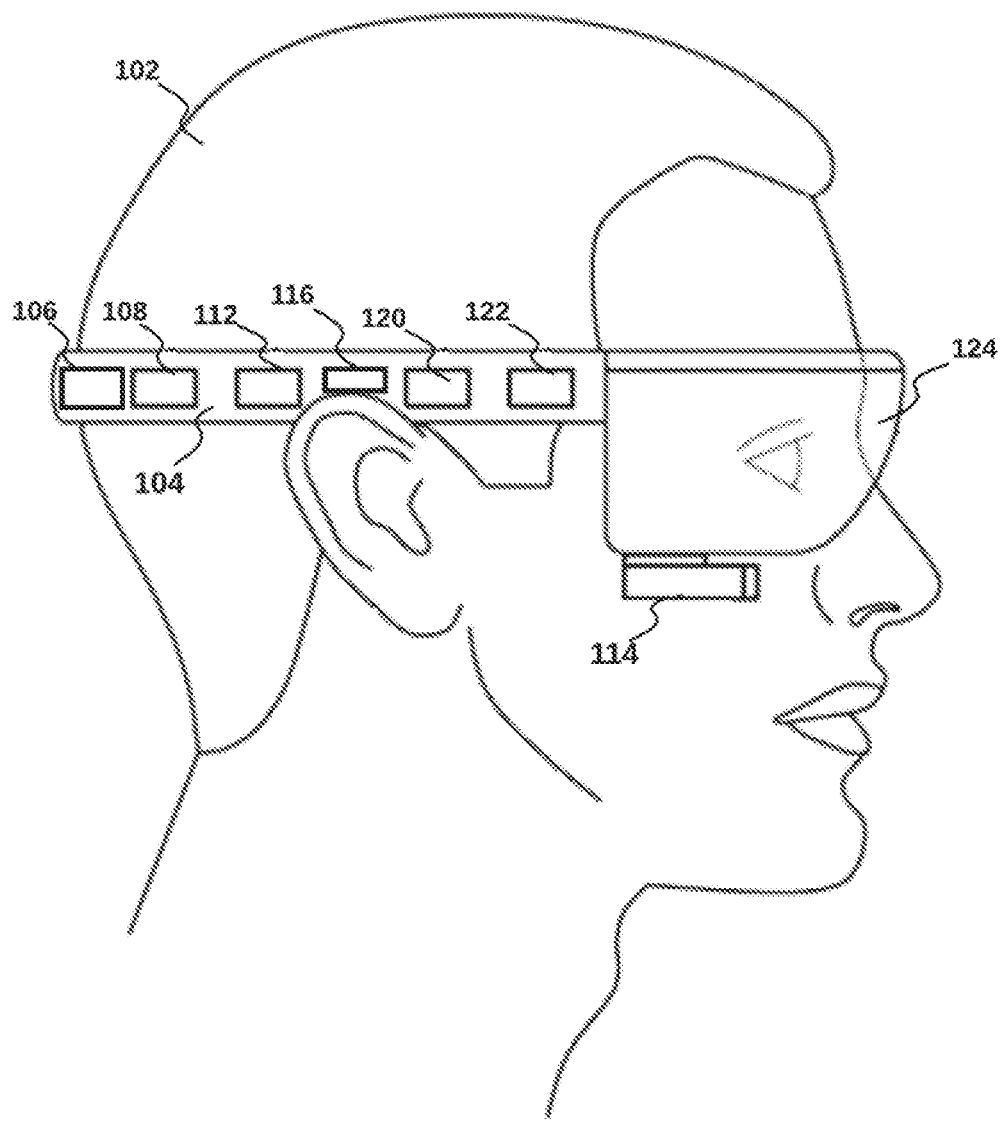
FIG. 1B is a schematic illustrating a MR digital model display device for use in a MR digital model display system, in accordance with one embodiment.

In accordance with an embodiment, and as shown in FIG. 1B, the MR digital model display device 104 is a head-mounted display (HMD) device worn by the user 102, such as an augmented reality (AR) or virtual reality (VR) visor (e.g., Google Glass®, HTC Vive®, Microsoft HoloLens®, the Playstation VR™, Oculus Rift™, and so forth). In the example embodiment, the user 102 (e.g., a construction engineer) experiences a VR environment or augmented reality (AR) environment while wearing the HMD MR digital model display device 104. During operation, in the example embodiment, the HMD MR digital model display device 104 is mounted on a head of the wearer 102, and over both eyes of the wearer 102, as shown in FIG. 1B. The wearer 102 may be presented with a virtual environment which may be viewed and edited via the HMD 104 and handheld devices as described herein. The HMD MR digital model display device 104 includes a transparent or semi-transparent visor (or "lens" or "lenses") 124 through which the wearer 102 views their surroundings (also herein referred to as "the real world"). In other embodiments (not shown in FIG. 1B), the HMD MR digital model display device 104 may include an opaque visor 124 which may obscure the wearer's 102 view of the real world and on which a complete virtual environment is displayed (e.g., including using video from the camera device 114 to represent the real world).

In accordance with an embodiment, the HMD MR digital model display device 104 shown in FIG. 1B includes components similar to the MR digital model display device 104 discussed in relation to FIG. 1A. For example, the HMD MR digital model display device 104 shown in FIG. 1B includes a display device 120, a networking device 112, a camera device 114, a CPU 106, a GPU 108, a memory 122, sensors 116, and one or more input devices 118 (not explicitly shown in FIG. 1B). In the example embodiment, the display device 120 may render graphics (e.g., virtual objects) onto the visor 124. As such, the visor 124 acts as a "screen" or surface on which the output of the display device 120 appears, and through which the wearer 102 experiences virtual content. The display device 120 may be driven or controlled by one or more graphical processing units (GPUs) 108. The GPU 108 processes aspects of graphical output that assists in speeding up rendering of output through the display device 120. In accordance with some embodiments, the display device 120 may include the visor 124.

In some embodiments, the digital camera device (or just "camera") 114 on the MR digital model display device 104 is a forward-facing video input device that is oriented so as to capture at least a portion of a field of view (FOV) of the wearer 102. In other words, the camera 114 captures or "sees" an angle of view of the real world based on the orientation of the HMD device 104 (e.g., similar to what the wearer 102 sees in the wearer's 102 FOV when looking through the visor 124). The camera device 114 may be configured to capture real-world digital video around the wearer 102 (e.g., a field of view, a peripheral view, or a 360° view around the wearer 102). In some embodiments, output from the digital camera device 114 may be projected onto the visor 124 (e.g., in opaque visor embodiments), and may also include additional virtual content (e.g., added to the camera output). In some embodiments there can also be a depth camera on the HMD 104 which captures depth information on the surroundings.

In some embodiments, the HMD MR digital model display device 104 shown in FIG. 1B may include one or more sensors 116, or may be coupled in wired or wireless communication with the sensors. For example, the HMD MR digital model display device 104 may include motion or position sensors configured to determine a position or orientation of the HMD 104. In some embodiments, the HMD MR digital model display device 104 may include a microphone for capturing audio input (e.g., spoken vocals of the user 102).

In some embodiments, the user 102 may hold one or more input devices 118 including hand tracking devices ("handhelds") (not separately shown in FIG. 1B) (e.g., one in each hand). The handhelds provide information about the absolute or relative position and orientation of a user's hands and, as such, are capable of capturing hand gesture information. The handhelds may be configured to operate directly with the HMD MR digital model display device 104 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handhelds. In other embodiments, the user 102 may wear one or more wearable hand tracking devices (e.g., motion tracking gloves, not shown), such as those made commercially available by Manus VR (Netherlands). In still other embodiments, hand motion ox the user 102 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position of one or more of the hands of the user 102 during operation.

In some embodiments, the MR digital model display system 100 and the various associated hardware and software components described herein Tray provide AR content instead of, or in addition to, VR content (e.g., in a mixed reality (MR) environment). It should be understood that the systems and methods described herein (e.g., with respect to FIG. 2) may be performed with AR content and, as such, the scope of this disclosure covers both AR and VR applications.

In accordance with an embodiment, FIG. 2 shows a method 200 for displaying a large 3D model on a remote device. In accordance with an embodiment, the method 200 may use the MR digital model display system 100 as shown in FIG. 1A and FIG. 1B. In various embodiments, some of the method elements shown may be performed concurrently, in a different order than shown, or may be omitted. In accordance with an embodiment, the large 3D model may include a set of objects and be hosted (e.g., stored) on a server (e.g., such as the MR digital model display server 130). In accordance with an embodiment, a large 3D model may include a large number of 3D objects (e.g., thousands, millions or more), occupy a large volume of space, or both. For example, the large 3D model may represent a large structure (e.g., construction site, sports stadium) or a building that covers a large area and that may contain many smaller objects that may be visualized using the method 200 by architects, engineers, construction workers, maintenance crews, owners, tenants, or prospective buyers. In another example, the large 3D model may represent a car, boat, a train, airplane or any vehicle that contains a large number of parts and is being designed by engineers, or visualized by sales people or prospective buyers using the method 200. In accordance with an embodiment, the remote device may be the MR digital model display device 104. Here, a "large" number or large size may be a number or size that transgresses a count threshold or size threshold, such as a predetermined or configurable count threshold or size threshold.

In accordance with an embodiment, at operation 202 of the method 200, the server MR digital model display module 134 receives and stores 3D object data for each 3D object included in a 3D model on a server 130 (e.g., in a memory 132 on the server 130). In accordance with an embodiment, the 3D object data may be generated by a creator (e.g., artist, engineer, architect, etc.) using a 3D creation software, application or module. The 3D object data may include a unique identifier, a position, an orientation, metadata, and rendering data. The position and orientation of a 3D object within the 3D model may describe a position and orientation of the 3D object within the 3D model (e.g., using a model coordinate system or a world coordinate system). In accordance with an embodiment, the unique identifier may include any alphanumeric value. In accordance with an embodiment, the rendering data includes data used to render the 3D object, including polygon meshes, material data (e.g., including color, textures, transparency and reflectivity data), and the like. In accordance with an embodiment, the metadata may include data describing the 3D object corresponding to a known data format used within CAD (Computer-aided Design). For example, the metadata may be in a BIM (Building Information Modeling) format. In accordance with an embodiment, the data stored in operation 202 may be modified or updated at any time (e.g., any time during an execution of the method 200) to represent a change in the 3D model (e.g., based on a change in construction plans).

In accordance with an embodiment, at operation 204 of the method 200, the client MR digital model display module 124 downloads unique identifiers and associated position data (which may include orientation data) for a set of the stored 3D objects within a 3D model. For example, unique identifiers and associated position data (which may include orientation data) for all stored 3D objects included within a 3D model may be downloaded as part of operation 204. In accordance with an embodiment, as part of operation 204, only an identifier and position data (which may include orientation data) are downloaded for a 3D object (e.g., excluding the downloading of metadata such as BIM and rendering data such as polygon mesh data and materials data). In accordance with another embodiment, as part of operation 204, only an identifier, position data (which may include orientation data), and metadata are downloaded for a 3D object (e.g., excluding the downloading of rendering data such as polygon mesh data and materials data).

In accordance with an embodiment, at operation 206 of the method 200, the client MR digital model display module 124 determines a position end an orientation of a virtual camera relative to positions of the 3D objects within the 3D model. In accordance with an embodiment, the position find orientation of the virtual camera along with the position (e.g., which may include orientation) of the 3D objects within the 3D model (or the position of the 3D model) are all associated with a common coordinate system. The associating to a common coordinate system may be performed by a method or system external to the method 200 described herein. For example, the common coordinate system may include coordinates given by GPS information such as latitude, longitude and altitude.

In accordance with an embodiment, the position and the orientation of the virtual camera may be determined by receiving a predefined position and a predefined orientation from the server 130. For example, this workflow supports what is typically referred to as "points of interest", "way points", or "view points" in design software, wherein a designer creates camera position and orientation pairs in a design software and publishes the pairs to the server 130, allowing a viewer to view a scene from the predefined camera positions and orientations using the method 200.

In accordance with an embodiment, the position and the orientation of the virtual camera may be determined by tracking a position and an orientation of the remote device 104 (e.g., an attitude of the remote device 104) and using the tracked position and orientation of the remote device 104 for the virtual camera. The determining of position and orientation of the remote device 104 may be accomplished by using data from the sensors 116 on the device (e.g., GPS, Wi-Fi, camera, accelerometer, gyroscope, and the like). In accordance with an embodiment, the determining of position and orientation may include converting the position and orientation to a common coordinate system with the 3D model and the 3D objects therein (e.g., aligning the device 104 with the 3D model). The conversion (e.g., alignment) may be done with a process which is external to the method 200.

In accordance with an embodiment, the position and the orientation of the virtual camera may be determined by computing a position and an orientation of the virtual camera that allow the virtual camera to see a maximum number of 3D objects within a 3D model while satisfying predetermined constraints. The constraints may be used to create a default position where a user can get a good spatial representation of the 3D model. For example, the constraints may include a requirement that the position of the virtual camera be outside the 3D model, or that the position be at a predetermined altitude (e.g., corresponding with a local road surface), and the like. For example, constraints may be chosen for viewing an entire 3D model building from ground level.

In accordance with an embodiment, the position and the orientation of the virtual camera may be described by a predetermined path. In accordance with an embodiment, the predetermined path may be stored on the server 130. In accordance with an embodiment, the predetermined path may be created with the remote device 104 (e.g., with the device 104 being moved along the path by a user). A predetermined path may be useful when used with the method 200 since a 3D model can still be too large to fit on the remote device 104 or to be displayed with an acceptable frame rate. Furthermore, a 3D model may not be static, and may change as part of a design process (e.g., by architects and engineers), so a predetermined path can show different data (e.g., different objects) at different times.

In accordance with an embodiment, as part of operation 206, the determining of the position and orientation of the virtual camera may be performed on a regular or irregular basis. For example, the determining of the position and orientation may be performed at a regular or irregular interval. As another example, the determining of the position and orientation may be triggered by a movement of the virtual camera (or remote device based on a tracking) over a configurable threshold.

In accordance with an embodiment, as part of operation 208 of the method 200, the client MR digital model display module 124 computes a visibility score for each one of the 3D objects within the 3D model. The visibility score for a 3D object may be based on a position of the 3D object relative to a position and an orientation of the virtual camera. The visibility score for a 3D object may be based on an orientation of the 3D object relative to a position and an orientation of the virtual camera. In accordance with an embodiment, the visibility score for a 3D object may be based in part on a distance of the 3D object from the virtual camera (e.g., 3D objects closer to the virtual camera may have a higher score). In accordance with an embodiment, the visibility score may be based in part on a size of the 3D object (e.g., larger objects may have a higher score). The size of a 3D object may be determined using metadata associated with the 3D object or using a bounding box associated with the 3D object. In accordance with an embodiment, the visibility score for a 3D object may be based in part on an amount of occlusion (e.g., measured as a percentage of obscured surface area or volume) of the object as seen from the position and the orientation of the virtual camera. For example, a 3D object with less occlusion may have a higher visibility score than a 3D object with more occlusion. In accordance with an embodiment, the amount of occlusion for a 3D object may be determined using position data for the camera and 3D object along with metadata and/or bounding box data for the 3D object. In accordance with an embodiment, the visibility score for a 3D object may be based in part on a position of the 3D object within a rendering frustum view of the virtual camera. For example, a 3D object near a center of a rendering frustum view screen for the virtual camera may have a higher visibility score than a 3D object near an edge of the rendering frustum view screen for the virtual camera. In accordance with an embodiment, the visibility score may be based in part on a relative height of the 3D object in screen coordinates (e.g., a frustum view screen of the virtual camera) relative to a height of the screen. The relative height of the 3D object may be determined using metadata and/or bounding box data associated with the 3D object. In accordance with an embodiment, the visibility score may be based in part on a relative width of the 3D object in screen coordinates (e.g., a frustum view screen of the virtual camera) relative to a width of the screen. The relative width of the 3D object may be determined using metadata and/or bounding box data associated with the 3D object. In accordance with an embodiment, the visibility score may be based in part on a relative area of the 3D object in screen coordinates (e.g., a frustum view screen of the virtual camera) relative to the area of the screen. The relative area of the 3D object may be determined using metadata and/or bounding box data associated with the 3D object.

In accordance with an embodiment, as part of operation 208, the determining of the visibility score may be performed on a regular or irregular basis. For example, the determining of the visibility score may be performed at a regular or irregular time period. In accordance with another embodiment, the determining of the visibility score may be performed based on a trigger, wherein the trigger may be based on a movement of the virtual camera (or remote device based on a tracking) over a configurable threshold. Accordingly, a new set of visibility scores may be generated over time (e.g., and used by operations 210, 212, 213, 214, 216, 218, and 220).

In accordance with an embodiment, as part of operation 210 of the method 200, the client MR digital model display module 124 determines whether rendering data for an unrendered 3D object (e.g., a 3D object not rendered on a display device 120) with a highest visibility score is present in the local storage (e.g., within the memory 122). At operation 212 of the method 200, based on the rendering data not being present in the local storage, the client MR digital model display module 124 downloads the rendering data for the unrendered 3D object from the server MR digital model display module 134 to the local storage. In accordance with an embodiment, during operation 212, the client MR digital model display module 124 uses a unique identifier associated with the unrendered 3D object to request rendering data for the unrendered 3D object from the server MR digital model display module 134. In accordance with an embodiment, operation 212 may be performed asynchronously so that multiple downloads may occur at a time. In accordance with an embodiment, at operation 213 of the method, the client MR digital model display module 124 performs operation 210 again by determining an additional 3D object with a next highest visibility score. In accordance with an embodiment, operation 213 may loop through operation 210 and operation 212 repeatedly searching for and downloading 3D objects with a next highest visibility score (e.g., from a highest score to a lowest score) until one of the following resource limits is met: an amount of storage allocated in the local storage exceeds a threshold; a number of 3D objects present in the local storage exceeds a threshold; or an amount of data downloaded by the MR digital model display device exceeds a threshold, wherein each threshold is predetermined (e.g., by a developer) or configurable (e.g., by an administrator). In accordance with an embodiment, the method 200 may include deleting data associated with a 3D object from the local storage if another 3D object with a higher visibility score is present on the server and not present in the local storage, while one of the resource limits is met.

In accordance with an embodiment, as part of operation 214 of the method 200, the client MR digital model display module 124 determines whether rendering data for an unrendered 3D object (e.g., a 3D object not rendered on a display device 120) with a highest score is present in the local cache memory (e.g., within the memory 122). At operation 216 of the method 200, based on the rendering data not being present in the local cache memory, the client MR digital model display module 124 loads the rendering data for the unrendered 3D object from the local storage to the local cache memory. In accordance with an embodiment, operation 216 may be performed asynchronously so that multiple 3D objects may be loaded at a time. In accordance with an embodiment, at operation 218 of the method, the client MR digital model display module 124 performs operation 214 again by checking for an additional unrendered 3D object with a next highest visibility score. In accordance with an embodiment, operation 218 may loop through operation 214 and operation 216 repeatedly for unrendered 3D objects with the next highest visibility score (e.g., from a highest score to a lowest score) until one of the following resource limits is met: an amount of memory allocated in the local cache memory exceeds a threshold; a number of 3D objects present in the local cache memory exceeds a threshold; or a frame rate for refreshing the display screen 120 is below a threshold, wherein each threshold is predetermined (e.g., by a developer) or configurable (e.g., by an administrator).

In accordance with an embodiment, as part of the method 200, operation 210, 212, and 213 may be merged with operation 214, 216, and 218. Accordingly, at operation 216 an 3D object with a highest determined visibility score may be downloaded directly from the server 130 to the local memory.

In accordance with an embodiment, as part of operation 220 of the method 200, the client MR digital model display module 124 renders and displays the 3D object with the highest visibility score for which rendering data is in the local cache memory. As part of operation 220, the client MR digital model display module 124 uses the rendering data (e.g., polygon mesh, material data, and the like) for the 3D object to render the 3D object. In accordance with an embodiment, the 3D object is displayed on the display device 120.

In accordance with an embodiment, the MR digital model display device 104 can be the same device as the MR digital model display server 130, allowing users to host (e.g., store) and view large 3D models on the same device using the method 200.

In accordance with an embodiment, the networking device 112 on the MR digital model display device 104 and the networking device 142 on the MR digital model display server 130 may be cellular devices and 3D object data may be transferred over a cellular network (e.g., during operation 204, 212, and 216). This scenario can transfer data over a local network using a VPN (Virtual Private Network) or over the Internet.

In accordance with an embodiment, the networking device 142 on the MR digital model display server 130 may use a cable to transfer 3D data to the networking device 112 on the MR digital model display device 104, which is physically connected by the cable.

In accordance with an embodiment, the MR digital model display device 104 may be a mixed reality device (e.g., as shown in FIG. 1B), and as part of operation 220, the MR digital model display device 104 displays the large 3D model in AR (Augmented Reality) or in VR (Virtual Reality). The position and the orientation of the virtual camera is determined by a position and an orientation (e.g., attitude) of the MR digital model display device 104 as determined by one or more sensors 116 present on the device 104, e.g., including a gyroscope, an accelerometer, and a camera.

In accordance with an embodiment, operation 202 of the method 200 includes storing a minimum bounding box for each 3D object within the large 3D model. In accordance with an embodiment, the minimum bounding box of a 3D object .includes orientation of the 3D object (e.g., an orientation with respect to the 3D model or common coordinates). In accordance with an embodiment, operation 202 may also include storing a representative color for the bounding box. Furthermore, operation 204 of the method 200 may include downloading the unique identifier, the position, and also downloading the minimum bounding box of the 3D object. Furthermore, operation 208 of the method 200 may include computing a visibility score of the minimum bounding box. Furthermore, operation 220 of the method 200 may include displaying a minimum bounding box in a color representative of a 3D object on the screen of the device 104 at the position and orientation of the 3D object while waiting for rendering data to be downloaded to the local storage (e.g., during operation 212) or loaded to the local memory (e.g., during operation 216).

In accordance with an embodiment, a bounding box for an object may be displayed with a color, wherein the color is based on a loading state of rendering data for the object. For example, a first color may represent a loading state wherein the rendering data for the object is not complete, a second color may represent a loading state wherein the rendering data for the object is requested for a current frame, a third color may represent a loading state wherein the rendering data for the object is backlogged, a fourth color may represent a loading error, and a fifth color may represent a loading state wherein the rendering data for the object has been removed (e.g., based on a resource limit being met).

In accordance with an embodiment, the method 200 may work with polygon mesh data as the rendering data. For example, the method may store in the server 130 (e.g., in operation 202), download from the server 130 to the device 104 (e.g., operation 212), load into a local cache memory (e.g., operation 216), and display (e.g., operation 220) only data associated with a polygon mesh for a 3D object.

In accordance with an embodiment, the method 200 may work with polygon mesh data and material data as the rendering data. For example, the method may store in the server 130 (e.g., in operation 202), download from the server 130 to the device 104 (e.g., operation 212), load into a local cache memory (e.g., operation 216), and display (e.g., operation 220) both polygon mesh and material data for a 3D object.

In accordance with an embodiment, 3D objects within the large 3D model may be segmented into a plurality of groups, with each group including a set of 3D objects. In accordance with an embodiment, operation 208 of the method 200 may include determining a visibility score for each 3D object in a group and assigning a single visibility score to the group (e.g., assigning the single visibility score to each object within the group). For example, the single visibility score may correspond to a highest visibility score for 3D objects within the group.

In accordance with an embodiment, the operation of segmenting a 3D model into a plurality of groups of objects may include one of the following: grouping 3D objects based on a proximity of their positions; grouping 3D objects based on minimizing a size of a minimum bounding box of a group; grouping 3D objects based on minimizing a total size of minimum bounding boxes of a plurality of groups; grouping 3D objects based on minimizing an overlap of minimum bounding boxes of a plurality of groups; or grouping 3D objects based on ensuring that a total number of objects in a group is above a minimum predetermined value and below a maximum predetermined value.

Figure 3:
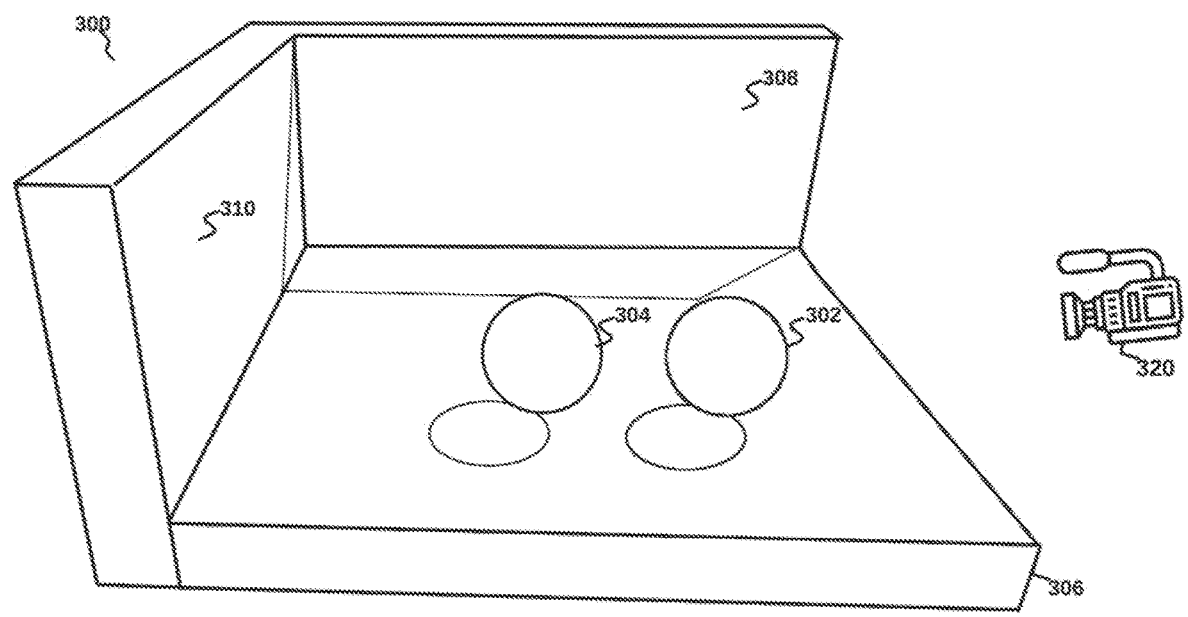
FIG. 3 is an illustration of an example large 3D model during a calculation of visibility score, in accordance with an embodiment.

In accordance with an embodiment. FIG. 3 is an illustration of 3D environment 300 (e.g., a 3D model) that includes a first spherical object 302, a second spherical object 304, a floor object 306, a first wall object 308, and a second wall object 310. The 3D environment 300 shown in FIG. 3 may illustrate the process of determining a visibility score as described in operation 208 of the method. The 3D environment 300 shown in FIG. 3 is for illustration purposes only, the method 200 (and in particular operation 208) may be used on a 3D environment with a much larger number of objects. In the example shown in FIG. 3, a virtual camera 320 is positioned above all objects within the environment 300, and pointed towards the first and second spherical objects 302 and 304. The position and orientation of the virtual camera 320 in FIG. 3 is for simplicity of explanation only; the camera 320 may be positioned and oriented anywhere in the environment. In accordance with an embodiment, and as part of operation 208, visibility scores may be determined for the objects (302, 304, 306, 308, and 310) within the environment. In accordance with an embodiment, based on position, the floor object 306 may have a highest visibility score based on a proximity to the virtual camera 320, followed by a next highest visibility score for the first spherical object 302, followed by a next highest visibility score for the first wall object 308, followed by a next highest visibility score for the second spherical object 304, followed by a next highest visibility score for the second wall object 310. Accordingly, for the environment 300 shown in FIG. 3, rendering data may be downloaded (e.g., as part of operation 212) from the server 130 to the local storage, and moved from the local storage to the local cache, and then rendered in the following order based on the visibility score: the floor object 306, the first spherical object 302, the first wall object 308, the second spherical object 304, and the second wall object 310.

Figure 4:
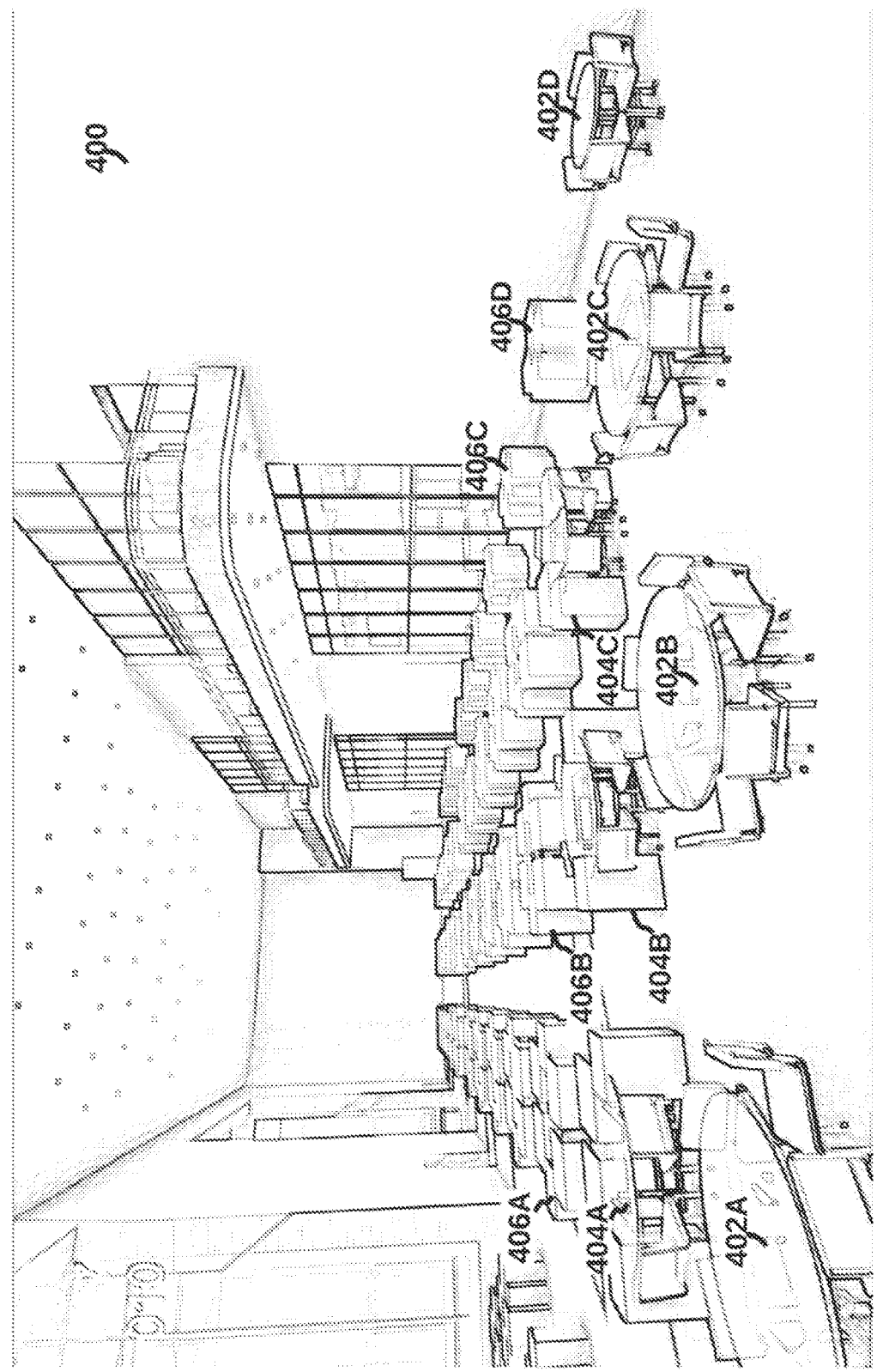
FIG. 4 is an illustration of an example large 3D model displayed using a MR digital model display system, in accordance with an embodiment.

In accordance with an example embodiment, and shown in FIG. 4 is an illustration of a large 3D model displayed using the method 200 described in FIG. 2. The view in FIG. 4 shows a dining room within a large building (wherein a virtual camera has been placed) that includes a plurality of tables and chairs. The illustration shows that tables and associated chairs nearest to the virtual camera (e.g., tables 402A, 402B, 402C, and 402D) have highest visibility scores due to proximity to the virtual camera position, and have been fully rendered. In addition, tables and associated chairs on a second row (e.g., 404A, 404B, and 404C) which is slightly further away from the virtual camera have a next highest visibility score and have only been partially rendered, with some chairs fully rendered and others displayed as bounding boxes. Further still from the camera are more tables and associated chairs which have lower visibility scores and are completely displayed as bounding boxes (e.g., including tables 406A, 406B, 406C, and 406D).

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
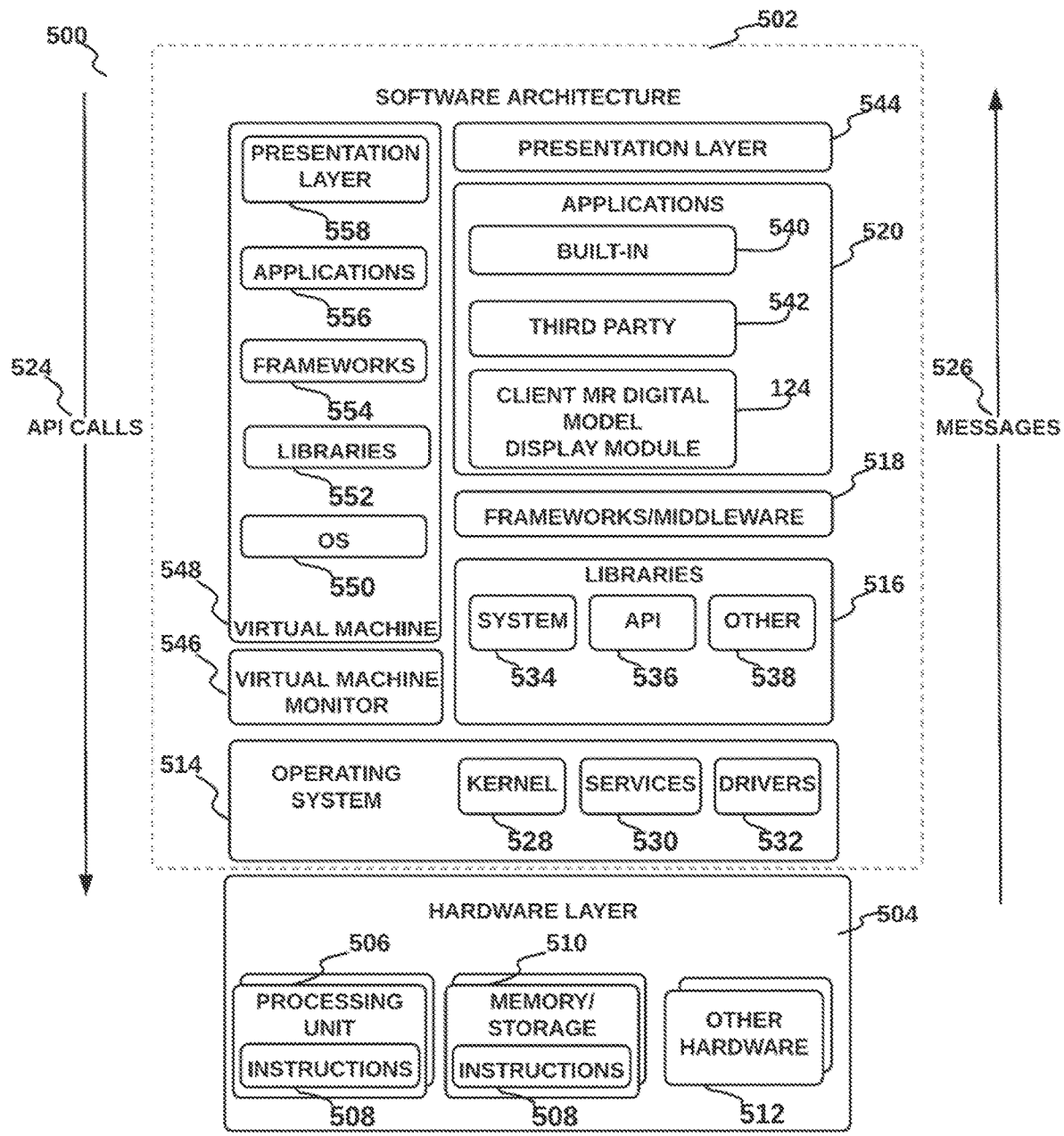
FIG. 5 is a block diagram illustrating an example software architecture, which may be used in conjunction with various hardware architectures described herein.

FIG. 5 is a block diagram 500 illustrating an example software architecture 502, which may be used in conjunction with various hardware architectures herein described to provide a gaming engine 501 and/or components of the MR digital model display system 100. FIG. 5 is a non-limiting example of a software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit

506 having associated executable instructions 508. The executable instructions 508 represent the executable instructions of the software architecture 502, including implementation of the methods, modules and so forth described herein. The hardware layer 504 also includes memory/storage 510, which also includes the executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks or middleware 518, applications 520 and a presentation layer 544. Operationally, the applications 520 and/or other components within the layers may invoke application programming interface (API) calls 524 through the software stack and receive a response as messages 526. The layers illustrated are representative in nature and not all software architectures have all layers. For example, some mobile or special purpose operating systems may not provide the frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than to interface directly with the underlying operating system 514 functionality (e.g., kernel 523, services 530 and/or drivers 532). The libraries 616 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 513 (also sometimes referred to as middleware) provide a higher-level common infrastructure that may be used by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 542 may invoke the API calls 524 provided by the mobile operating system such as operating system 514 to facilitate functionality described herein.

The applications 520 may use built-in operating system functions (e.g., kernel 528, services 530 and/or drivers 532), libraries 516, or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures use virtual machines. In the example of FIG. 5, this is illustrated by a virtual machine 548. The virtual machine 548 creates a software environment where applications/modules can execute as if they were executing on a hardware machine (such as the machine 600 of FIG. 6, for example). The virtual machine 548 is hosted by a host operating system (e.g., operating system 514) and typically, although not always, has a virtual machine monitor 546, which manages the operation of the virtual machine 548 as well as the interface with the host operating system (i.e., operating system 514). A software architecture executes within the virtual machine 548 such as an operating system (OS) 550, libraries 552, frameworks 554, applications 556, and/or a presentation layer 558. These layers of software architecture executing within the virtual machine 548 can be the same as corresponding layers previously described or may be different.

Figure 6:
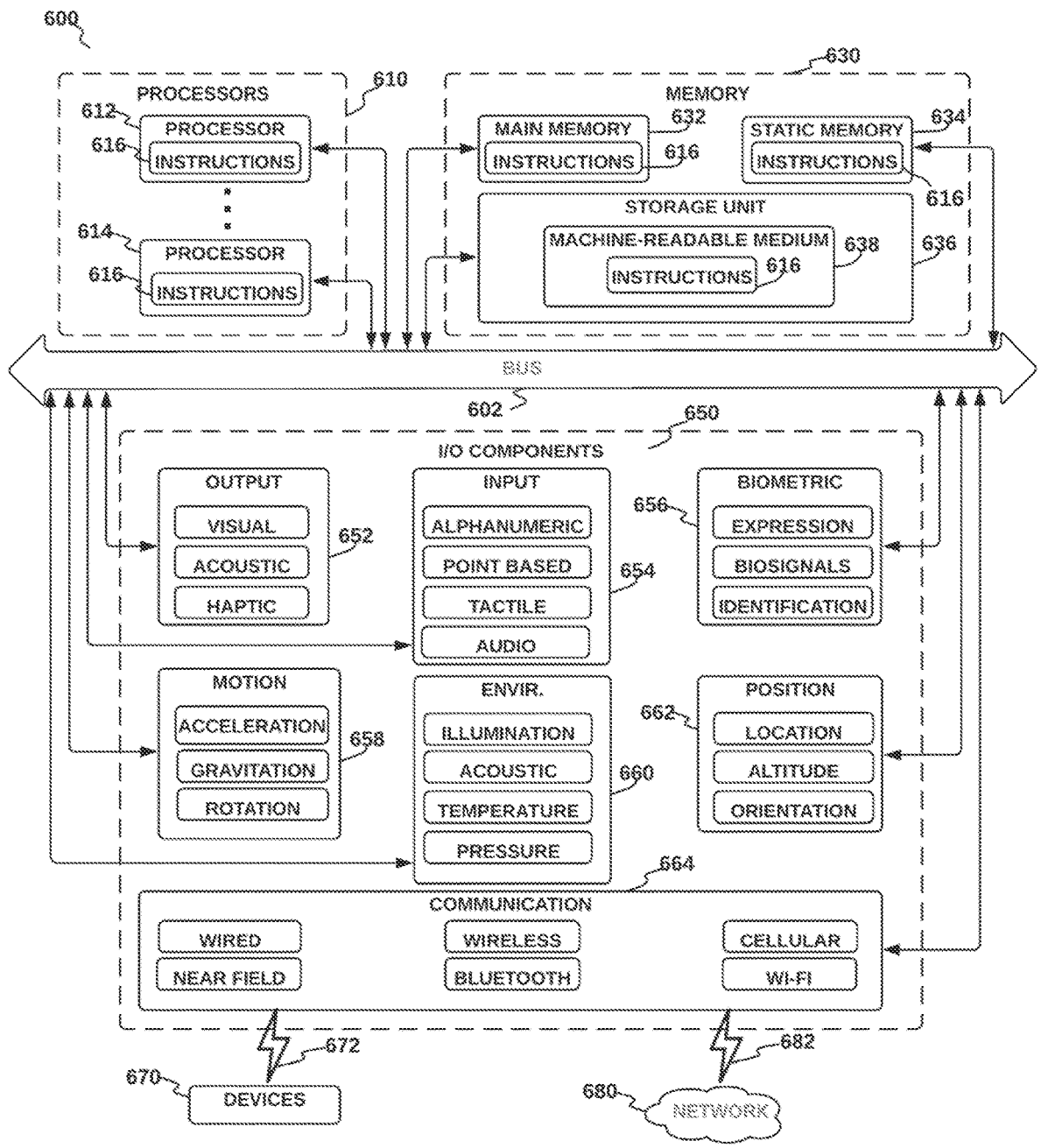
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 600, according to some example embodiments, configured to read instructions from a machine-readable medium (e.g., a machine-readable storage medium) and perform any one or more of the methodologies discussed herein. In some embodiments, the machine 600 is similar to the MR digital model display device 104. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. As such, the instructions 616 may be used to implement modules or components described herein. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that may execute the instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 may include a memory, such as a main memory 632, a static memory 634, or other memory, and a storage unit 636, both accessible to the processors 610 such as via the bus 602. The storage unit 636 and memory 632, 634 store the instructions 616 embodying any one or more of the methodologies or functions described herein. The instructions 616 may also reside, completely or partially, within the memory 632, 634, within the storage unit 636, within at least one of the processors 610 (e.g., within the processor's cache memory), or any suitable combination thereof, during execution thereof by the machine 600. Accordingly, the memory 632, 634, the storage unit 636, and the memory of processors 610 are examples of machine-readable media 638.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 650 may include a wide variety of components to receive input, provide output, produce output, transmit information, exchange information, capture measurements, and so on. The specific input/output (I/O) components 650 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 650 may include many other components that are not shown in FIG. 6. The input/output (I/O) components 650 are grouped according to functionality merely for simplifying the following discussion and the grouping is in no way limiting. In various example embodiments, the input/output (I/O) components 650 may include output components 652 and input components 654. The output components 652 may include visual components (e.g., a display such as a plasma display panel (PDF), a light emitting diode (LSD) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 662, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
   one or more computer processors;
   one or more computer memories;
   a set of instructions stored in the one or more computer memories, the set of instructions configuring the one or more computer processors to perform operations comprising:
   downloading a set of unique identifiers and associated positions for a set of digital objects within a 3D model without downloading any additional data for the set of digital objects before a computing of a visibility score for each digital object of the set of digital objects:
   determining a position and an orientation of a virtual camera relative to the positions of the set of digital objects;
   performing the computing of the visibility score for each digital object of the set of digital objects based on a position of the digital object relative to the position and the orientation of the virtual camera;
   downloading a polygon mesh associated with a digital object with a highest visibility score based on the polygon mesh being absent from the one or more computer memories, the downloading using a unique identifier of the set of unique identifiers; and
   rendering and displaying the polygon mesh of the digital object with the highest score on a display device.

2. The system of claim 1, wherein the operations further include:
   downloading data describing one or more materials for the polygon mesh along with the downloading of the polygon mesh; and
   rendering and displaying the polygon mesh based on the one or more materials.

3. The system of claim 1, wherein the operations further include:
   downloading a set of minimum bounding boxes, wherein each bounding box within the set is associated with at least one digital object of the set of digital objects; and computing the visibility score for the digital object based on a visibility of a minimum bounding box associated with the digital object.

4. The system of claim 3, wherein the operations further include:
asynchronously downloading the polygon mesh; and
displaying a minimum bounding box associated with the digital object during the asynchronous downloading of the polygon mesh.

5. The system of claim 3, wherein the operations further include:
asynchronously loading the polygon mesh for a digital object from the local storage device to the local cache memory device; and
displaying a minimum bounding box associated with the digital object during the asynchronous loading of the polygon mesh.

6. The system of claim 3, wherein the operations further include:
associating a color with a digital object associated with a minimum bounding box, the color representing a loading state for data describing the digital object, and
displaying the minimum bounding box in the representative color.

7. The system of claim 1, wherein the position and the orientation of the virtual camera are determined by performing one or more of the following:
downloading a predefined position and predefined orientation;
tracking a position and orientation of a mobile device and using the tracked position and orientation for the virtual camera;
computing a position and an orientation of the virtual camera that allow the virtual camera to see the set of the digital objects while being as close as possible to a point located at a center of the set of digital objects; and
moving the virtual camera along a predetermined path.

8. The system of claim 1, wherein the display device includes a screen with a width, a height, and an area, and the step of computing the visibility score for a digital object includes computing a score based on one or more of the following:
a height of the digital object in screen coordinates relative to the height of the screen;
a width of the digital object in screen coordinates relative to the width of the screen;
an area of the digital object in screen coordinates relative to the area of the screen;
a distance between the virtual camera and the position of the digital object; and
an occlusion of the digital object by an additional digital object.

9. The system of claim 1, the operations further comprising repeatedly downloading additional polygon meshes associated with additional digital objects of the set of digital objects, each of the additional digital objects having a respective next highest visibility score, until one of the following resource limits is met:
an amount of storage allocated exceeds a threshold;
a number of digital objects present exceeds a threshold; or
an amount of data downloaded exceeds a threshold.

10. The system of claim 9, wherein the operations further comprise deleting a first digital object of the set of digital objects from the one or more computer memories based on the following:
a determination that one of the resource limits is met;
a determination that a second digital object of the set of digital objects has a higher visibility score than the first digital object, and
a determination that the second digital object is present on a remote device and not present in the one or more memories.

11. The system of claim 1, wherein the operation of loading the polygon mesh from the local storage device to the local cache memory is performed repeatedly for digital objects with a next highest visibility score until one of the following resource limits is met:
an amount of memory allocated in the local cache memory exceeds a threshold;
a number of digital objects present in the local cache memory exceeds a threshold; or
a frame rate for refreshing the display device is below a threshold.

12. The system of claim 1, wherein the operations further include:
segmenting the 3D model into a plurality of groups of digital objects;
assigning a visibility score to each group of the plurality of groups based on a position of objects within the group relative to the position and the orientation of the virtual camera; and
determining one group with a highest visibility score and rendering and displaying one or more polygon meshes associated with digital objects within the one group.

13. The system of claim 12, wherein segmenting the 3D model into a plurality of groups of digital objects includes one of the following:
adding a set of digital objects into a group based on a proximity of position of the set of digital objects;
adding a set of digital objects into a group based on minimizing a size of a minimum bounding box of the set of digital objects;
determining the plurality of groups based on minimizing a total size of minimum bounding boxes of the plurality of groups;
determining the plurality of groups based on minimizing an overlap of minimum bounding boxes of the plurality of groups, and
determining the plurality of groups based on a total number of digital objects in a group being above a configurable minimum value and below a configurable maximum value.

14. The system of claim 1, wherein the operations further include:
downloading metadata for a digital object of the set of digital objects; and
computing a visibility score for the digital object based at least on the metadata.

15. A non-transitory computer-readable storage medium storing a set of instructions that, when executed by one or more computer processors, causes the one or more computer processors to perform operations, the operations comprising:
downloading a set of unique identifiers and associated positions for a set of digital objects within a 3D model without downloading any additional data for the set of digital objects before a computing of a visibility score for each digital object of the set of digital objects;
determining a position and an orientation of a virtual camera relative to the positions of the set of digital objects;
performing the computing of the visibility score for each digital object of the set of digital objects based on a position of the digital object relative to the position and the orientation of the virtual camera;

downloading a polygon mesh associated with a digital object with a highest visibility score based on the polygon mesh being absent from the one or more computer memories, the downloading using a unique identifier of the set of unique identifiers, the downloading using a unique identifier of the set of unique identifiers; and rendering and displaying the polygon mesh of the digital object with the highest score on a display device.

16. The non-transitory computer-readable storage medium of claim 15, wherein the operations further include:

downloading a set of minimum bounding boxes, wherein each bounding box within the set is associated with at least one digital object of the set of digital objects;

computing the visibility score for the digital object based on a visibility of a minimum bounding box associated with the digital object;

asynchronously downloading the polygon mesh; and displaying a minimum bounding box associated with the digital object during the asynchronous downloading of the polygon mesh.

17. The non-transitory computer-readable storage medium of claim 15, wherein the operations further include:

associating a color with a digital object associated with a minimum bounding box, the color representing a loading state for data describing the digital object; and displaying the minimum bounding box in the representative color.

18. The non-transitory computer-readable storage medium of claim 15, wherein the position and the orientation of the virtual camera are determined by performing one or more of the following:

downloading a predefined position and predefined orientation;

tracking a position and orientation of a mobile device and using the tracked position and orientation for the virtual camera;

computing a position and an orientation of the virtual camera that allow the virtual camera to see the set of the digital objects while being as close as possible to a point located at a center of the set of digital objects; and moving the virtual camera along a predetermined path.

19. A method comprising:

downloading a set of unique identifiers and associated positions for a set of digital objects within a 3D model without downloading any additional data for the set of digital objects before a computing of a visibility score for each digital object of the set of digital objects;

determining a position and an orientation of a virtual camera relative to the positions of the set of digital objects;

performing the computing of the visibility score for each digital object of the set of digital objects based on a position of the digital object relative to the position and the orientation of the virtual camera;

downloading a polygon mesh associated with a digital object with a highest visibility score based on the polygon mesh being absent from the one or more computer memories, the downloading using a unique identifier of the set of unique identifiers, the downloading using a unique identifier of the set of unique identifiers; and rendering and displaying the polygon mesh of the digital object with the highest score on a display device.

20. The system of claim 1, the downloading of the polygon mesh further including downloading the polygon mesh into a local storage device and loading the polygon mesh from the local storage device into a local cache memory based on the polygon mesh being absent from the local cache memory, the local cache memory being used during the rendering.

* * * * *